E. KOEB.
SUSPENSION SPRING.
APPLICATION FILED DEC. 22, 1916.
1,237,655.
Patented Aug. 21, 1917.
3 SHEETS—SHEET 1.
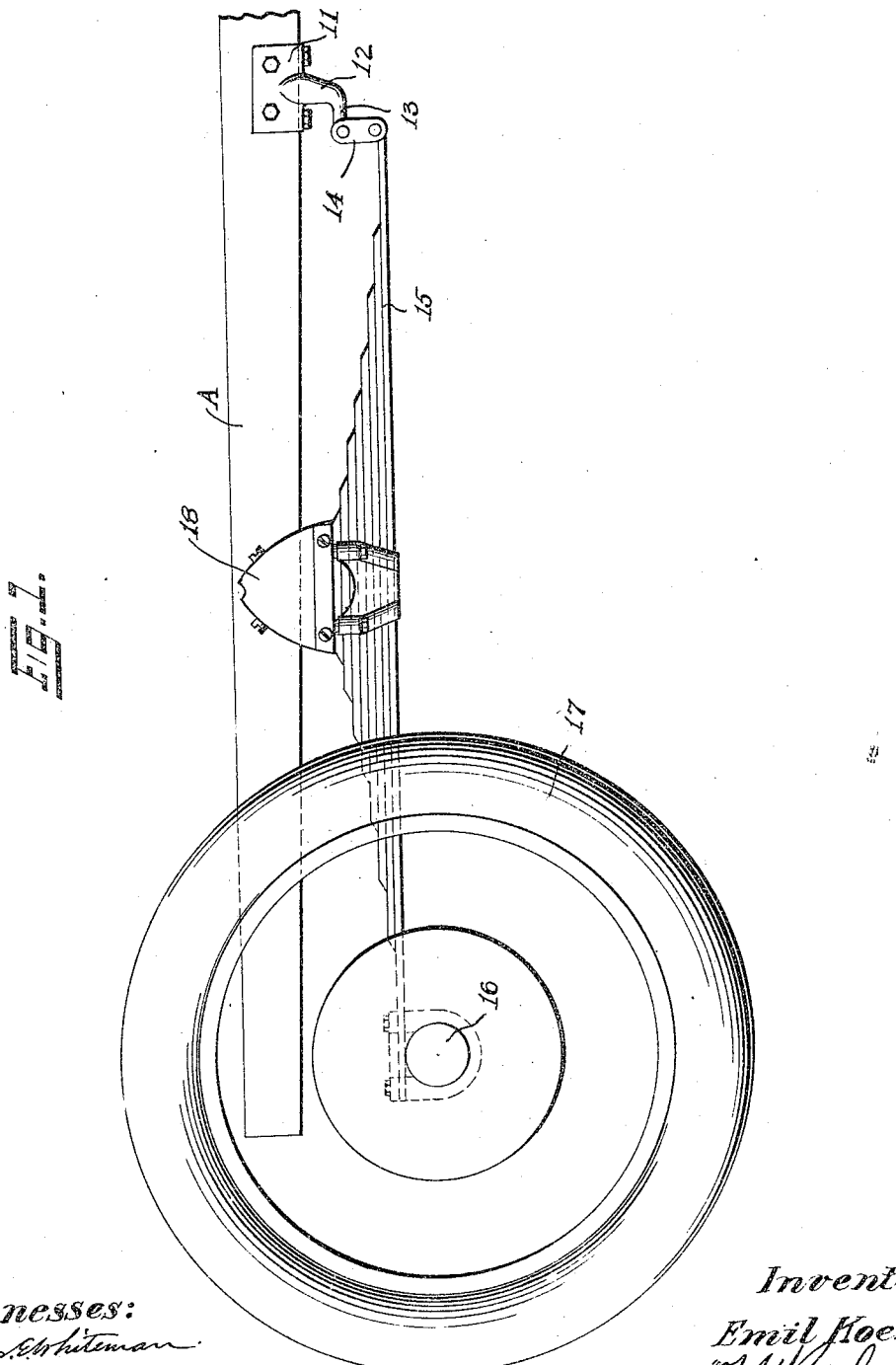
Witnesses:
Chas. G. Whiteman
H. D. Penney
Inventor:
Emil Koeb.
By his Atty, F. H. Richards E. KOEB.
SUSPENSION SPRING.
APPLICATION FILED DEC. 22, 1916.
1,237,655.
Patented Aug. 21, 1917.
3 SHEETS—SHEET 2.
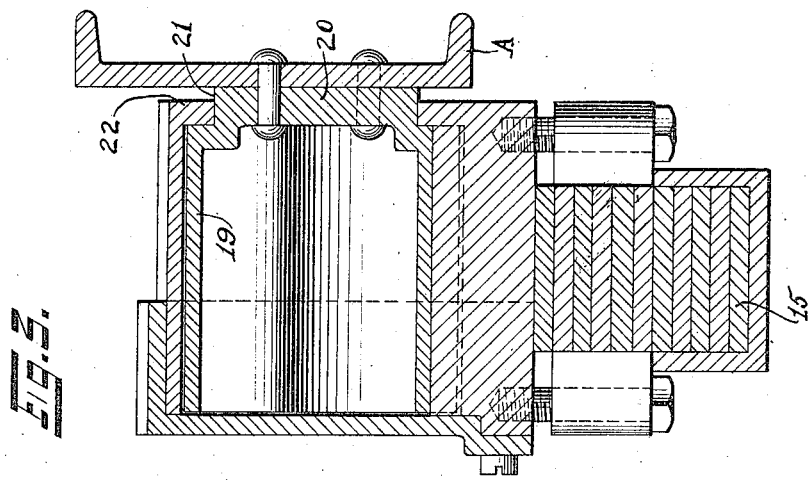
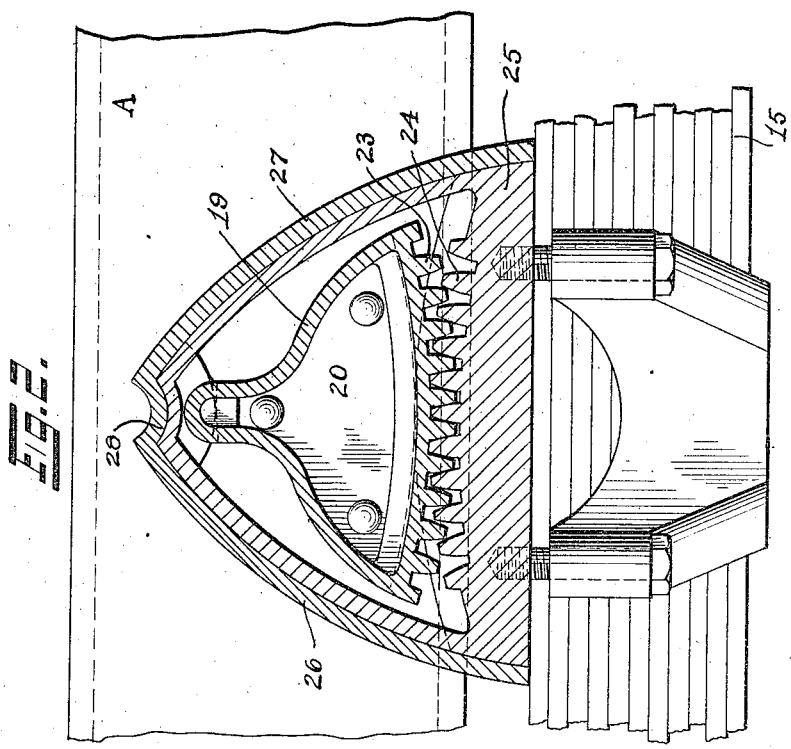
Witnesses:
Chas E Whiteman
H. D. Penney
Inventor:
Emil Koeb.
By his Atty, F W Richard E. KOEB.
SUSPENSION SPRING.
APPLICATION FILED DEC. 22, 1916.
1,237,655.
Patented Aug. 21, 1917.
3 SHEETS—SHEET 3.
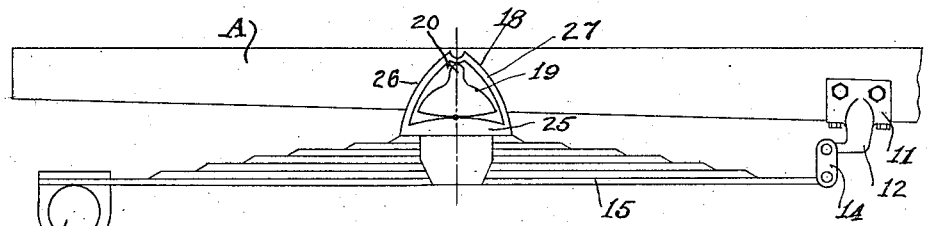
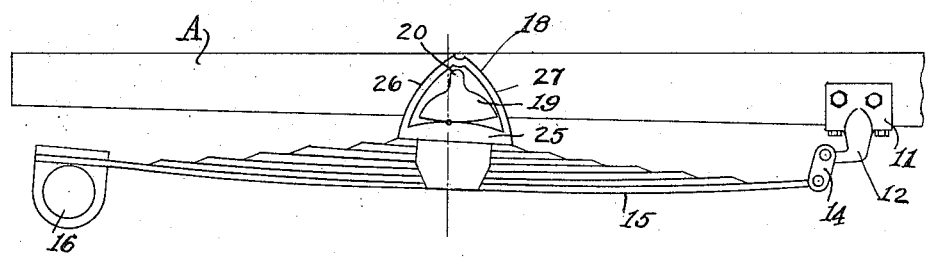
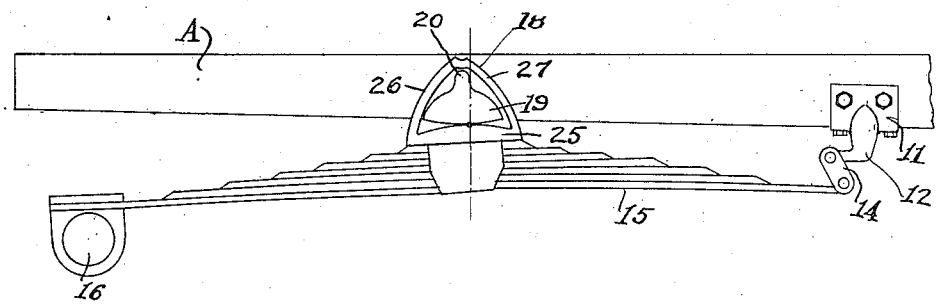
Witnesses:
Inventor:
Emil Koeb.
By his Atty,

UNITED STATES PATENT OFFICE.

EMIL KOEB, OF NEW YORK, N. Y.

SUSPENSION-SPRING.

1,237,655.

Specification of Letters Patent.  Patented Aug. 21, 1917.

Application filed December 22, 1916. Serial No. 138,306.

*To all whom it may concern:*

Be it known that I, EMIL KOEB, a citizen of the United States, residing in New York, in the county of New York and State of New York, have invented certain new and useful Improvements in Suspension-Springs, of which the following is a specification.

This invention relates to vehicle frames in general, and more especially to spring suspension means for vehicle frames adapted for automobiles and the like, similar to the construction illustrated in my copending application, Serial No. 107898, filed July 7, 1916.

One of the main objects of the present invention is to provide a floating connection between the chassis and the spring. To this end an embodiment is provided which is particularly adapted for the cantaliver spring construction in which a leaf spring is pivotally connected at one end to the chassis, at its other end to the axle of the wheels, and approximately at its center by a floating connection to the chassis.

These and other features, capabilities and advantages of the invention will appear from the subjoined detail description of one specific embodiment thereof, illustrated in the accompanying drawings, in which Figure 1 is a side elevation of a portion of a chassis of an automobile equipped with the present invention.

Fig. 2 is a transverse section of the floating connection.

Fig. 3 is an axial section of the same.

Figs. 4, 5, and 6 illustrate, diagrammatically, successive positions of the spring relative to the chassis.

In the embodiment illustrated the chassis of an automobile is designated by the reference character A, to which is secured the bracket 11 having a downwardly depending finger 12, to the rearward extension 13 of which is pivotally secured the link 14. To the lower end of the link 14 is pivotally connected one end of the leaf spring 15, the other end of which spring 15 is pivotally connected to the axle 16 on which the wheels 17 are mounted.

At approximately the middle of the leaf spring 15 is secured the housing 18 which coöperates with the bracket 19 (Fig. 2) to pivotally secure the middle of the spring 15 to the chassis A.

The bracket 19 has a diminished neck portion 20 which is disposed adjacent to the chassis A, the upper surface 21 of which forms a bearing surface for the curved portion 22 of the housing 18. The lower portion of the bracket 19 forms a gear segment 23, the teeth of which mesh with the teeth of the gear segment 24 formed on the housing 18. The housing 18 in contour comprises a lower concave portion 25 on the inner side of which the teeth 24 are formed, and two convex side portions 26 and 27 that terminate at their upper ends in the curved portion 28. The rear of the curved portion 28 terminates in the curved portion 22.

In the operation of the device it will be seen that whenever the shaft 16 is raised, the leaf spring 15 will be flexed, at which time it will draw toward the shaft 16 the link 14, and at the same time the housing 18 will rock around the bracket 19, with its neck portion 22 rolling on the surface 21 and its gear segment 24 coöperating with the gear segment 23 of the bracket 19. In this way the lower point of contact between the bracket 19 and housing 18 will shift toward the shaft 16.

It is obvious that various changes and modifications may be made to the details of construction without in any way departing from the general spirit or scope of the present invention.

I claim:

1. In a device of the class described, the combination with an axle, of a chassis; a spring connected at one end to said axle and at its other end to said chassis; a floating connection for connecting the intermediate portion of said spring to said chassis; said floating connection comprising a member secured to the spring and a member secured to the chassis, said members having meshing gear teeth.

2. In a device of the class described, the combination with an axle, of a chassis; a spring connected at one end to said axle and at its other end to said chassis; a floating connection for connecting the intermediate portion of said spring to said chassis, the floating connection comprising a housing secured to the spring; and a bracket secured to the chassis over which the housing extends, the upper end of the bracket forming a bearing for the upper portion of the housing; and the lower end of the bracket having teeth; and a gear-segment on the housing for coöperating with the teeth on said bracket.

3. In a device of the class described, the combination with an axle, of a chassis; a spring connected at one end to said axle and at its other end to said chassis; and a floating connection between said spring and said chassis at substantially the middle of said spring, said floating connection comprising a housing, a bracket therewithin, the upper interior wall surface of the housing contacting with a rock-point at the upper end of the bracket.

4. In a device of the class described, the combination with an axle, of a chassis; a spring connected at one end to said axle and at its other end to said chassis; and a floating connection between said spring and said chassis, said connection comprising a member carried by the chassis and a member carried by the spring embracing the first mentioned member and rockable thereon.

5. In a device of the class described, the combination with an axle, of a chassis; a spring connected at one end to said axle and at its other end to said chassis; and a floating connection between said spring and said chassis, said connection comprising a member carried by the chassis and a member carried by the spring embracing the first mentioned member and rockable thereon, and said members having meshing gear teeth.

EMIL KOEB.

Witnesses:
WILLIAM KOEB,
L. W. KELLEY.

Copies of this patent may be obtained for five cents each, by addressing the "Commissioner of Patents, Washington, D. C."